Aug. 2, 1932.   F. SCHNABL   1,869,512

OPTICAL SQUARE

Filed Oct. 23, 1930

Inventor:
Franz Schnabl

Patented Aug. 2, 1932

1,869,512

UNITED STATES PATENT OFFICE

FRANZ SCHNABL, OF JENA, GERMANY, ASSIGNOR TO BAUSCH & LOMB OPTICAL CO., OF ROCHESTER, NEW YORK

OPTICAL SQUARE

Application filed October 23, 1930, Serial No. 490,801, and in Germany March 13, 1930.

All-glass reflecting bodies are generally used only with optical square instruments of small dimensions. Larger instruments of this kind consist as a rule of a support and reflecting glass plates. The inconveniences inherent in this execution are stated in the United States Letters Patent 995,235 which also explains how they can be overcome.

The present invention serves the same purpose and refers to a new solution of the problem. This solution consists in providing glass plates of such a form that those of its parts with which they are fixed to the support can readily adapt themselves to the deformations of the support as are caused by changes in temperature, without forces that could cause tensions of the reflecting part of the glass plates acting on the glass plates themselves.

The inventive idea can be realized by providing at least one edge surface of the glass plates with heads that are of the same piece as the glass plate and are each connected with the reflecting part of the same by a neck which is elastic owing to its comparatively small diameter. Such heads are expediently provided on more than one edge surface, when the support, which may consist of one or several parts, grips the glass plates at two edge surfaces which are opposite to each other and when the glass plate, which may have any construction, is desired to be connected to several edge surfaces of the support. When the heads themselves are small, the desired elasticity can be arrived at by using necks of a diameter which equals that of the said heads.

When the device forms a constituent part of a measuring instrument, a rangefinder for example, the connexion of the support to the rangefinder may be similar to that of the glass plates to this support. In this case it is advisable to provide the support with an attaching foot that is made of the same piece and is connected thereto by means of a thin connexion piece.

The invention naturally can be used quite as advantageously with optical square instruments also when the reflecting parts are not of glass but of another suitable material, say quartz.

Figures 1, 3:
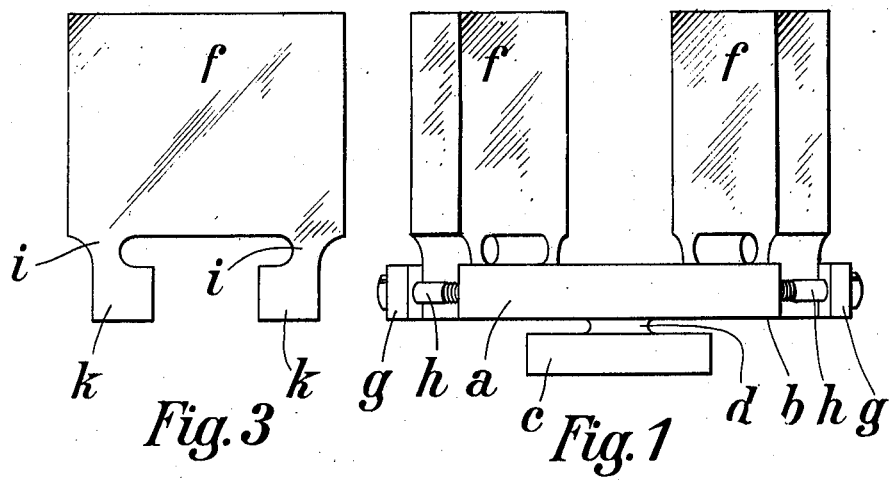
Figure 2:
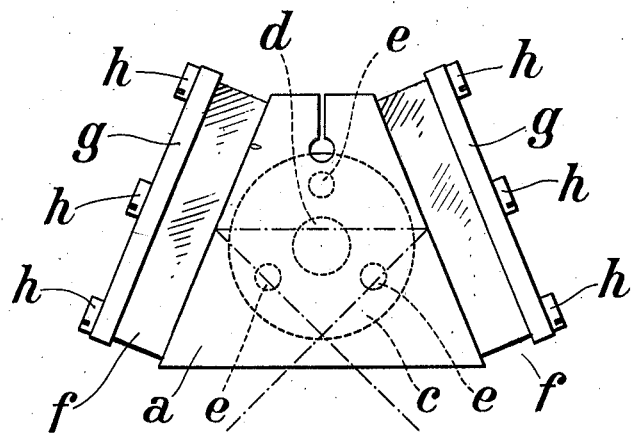

In the accompanying drawing Figure 1 represents in front elevation an optical square of 90° deflexion for use in conjunction with a rangefinder, Figure 2 is a top plan view of same, and Figure 3 is a front elevation of a single reflecting part of the optical square.

The device represented in the drawing has a trapeziform support $a$ of which the lower surface, $b$, is connected with an attaching flange or foot $c$ by means of a thin connexion piece $d$. The flange $c$ has holes $e$ for inserting fixing screws. On the two side edges of the support $a$, which enclose an angle of 45°, glass plates $f$ are fixed by means of rods $g$ and three screws $h$ each. The glass plates $f$ have silvered backs and take the form of rectangular plates whereof one edge surface has two heads $k$ formed integral therewith and connected thereto by thin necks $i$.

When the new optical square is in use and the temperature changes, which would cause distortions owing to the unequal coefficients of expansion of the different material, the elasticity of the necks $i$ allows these necks to yield so much that the rectangular reflecting parts of the glass plates $f$ remain without tension. Also tensions which are caused by screwing the optical square to the flange $c$ of the rangefinder are not imparted to the support $a$ by the connexion piece $d$.

I claim:

1. An optical square comprising a support and two reflecting members carried by said support, each of said reflecting members being connected to said support by means of heads which are formed integral with the members and are connected thereto by means of relatively thin neck portions.

2. An optical square having in combination a support and a glass reflecting member, said member having head portions integrally connected therewith by means of relatively thin, elastic neck portions, said member being connected to said support by means of said head portions.

3. An optical square comprising a support and reflecting members mounted on said support, said support having an attaching flange integrally connected therewith by means of a relatively thin, yieldable connecting neck.

FRANZ SCHNABL.